US012740582B2

(12) United States Patent
Schorr

(10) Patent No.: US 12,740,582 B2
(45) Date of Patent: Sep. 22, 2026

(54) EXTRACTS FOR HEALTH SUPPLEMENTS

(71) Applicant: Steven M. Schorr, Kula, HI (US)

(72) Inventor: Steven M. Schorr, Kula, HI (US)

(73) Assignee: EXTENDED LONGEVITY, HI (US)

( * ) Notice: Subject to any disclaimer, the term of this patent is extended or adjusted under 35 U.S.C. 154(b) by 463 days.

(21) Appl. No.: 18/121,398

(22) Filed: Mar. 14, 2023

(65) Prior Publication Data

US 2023/0320397 A1 Oct. 12, 2023

Related U.S. Application Data

(60) Provisional application No. 63/319,699, filed on Mar. 14, 2022.

(51) Int. Cl.
*A23L 33/105* (2016.01)
*A23L 33/18* (2016.01)
*A23L 33/28* (2016.01)

(52) U.S. Cl.
CPC ............. *A23L 33/105* (2016.08); *A23L 33/18* (2016.08); *A23L 33/28* (2016.08)

(58) Field of Classification Search
CPC ......... A23L 33/105; A23L 33/18; A23L 33/28
See application file for complete search history.

(56) References Cited

FOREIGN PATENT DOCUMENTS

WO WO2020136593 A1 * 7/2020 ............. A61K 36/00

OTHER PUBLICATIONS

Frequently Asked Questions, Jan. 21, 2022, Extended Longevity, pp. 1-3. (Year: 2022).*
Biomarkers Test Results, Jan. 21, 2022, Extended Longevity, pp. 1-6. (Year: 2022).*
Matthews, Extended Longevity Announces New Study to Provide Additional Data for Its Profound Biological Age Reversal Protocol, Jun. 3, 2021, BusinessWire, pp. 1-5. (Year: 2021).*
Extended Longevity, Phytotherapeutics for Life Extension, Dec. 28, 2020, Extendedlongevity.com, https://web.archive.org/web/20201228232312/https://www.extendedlongevity.com/, 3 pages. (Year: 2020).*

* cited by examiner

*Primary Examiner* — Trevor Love
(74) *Attorney, Agent, or Firm* — BAKER HOSTETLER LLP

(57) ABSTRACT

A cocktail of compositions divided into modules to supplement health or have therapeutic effective by delivering aliquots or doses of one or more consumptions of Pinetonal, Thyvolve, Bluecosig, Telogenic, Sentophagy, Inflasolve, Stemegenis, CMEnhance, Epivers, Elastage ECM, *Cnidium*, Emophix and Cognilace disclosed herein which have been associated with measured telomere lengthening which is a measure of cellular age.

13 Claims, 17 Drawing Sheets

| Age ≠ / sex | Epigenome Test (Biological Age) | | | Telomere Regrowth | | | CRP Levels | | |
|---|---|---|---|---|---|---|---|---|---|
| | Baseline | 12 mo | 24 mo | Baseline | 12 mo | 24 mo | Baseline | 12 mo | 24 mo |
| 42 / male | N/A | 33 (9 year deceleration of extrinsic age) | 35 (7 year deceleration) | N/A | 9.15 KB + | N/A | N/A | N/A | N/A |
| 57 / female | 60 # | 45 (12 year deceleration of extrinsic age) | N/A | 7.02 KB | N/A | N/A | 0.6 @ | 0.2 @ | N/A |
| 66 / male | 67 # | 52 (14 year deceleration) *^ | 51 (15 year deceleration) *^ | N/A | 9.05 KB + | N/A | 0.6 @ | 0.6 @ | 0.4 $ |
| 74 / male | N/A | 60 (14 year deceleration) * | N/A | N/A | 9.3 KB + | N/A | 1.3 @ | 0.6 @ | |

≠Chronological age at the start of the study
*TruDiagnostic, ^Elysium, #DNAge, +SpectroCell, $Jinfiniti, @local physician's diagnostic labora

| Age[≠] / sex | Epigenome Test (Biological Age) | | | Telomere Regrowth | | | CRP Levels | | |
|---|---|---|---|---|---|---|---|---|---|
| | Baseline | 12 mo | 24 mo | Baseline | 12 mo | 24 mo | Baseline | 12 mo | 24 mo |
| **42 / male** | N/A | 33 (9 year deceleration of extrinsic age) | 35 (7 year deceleration) | N/A | 9.15 KB[+] | N/A | N/A | N/A | N/A |
| **57 / female** | 60[#] | 45 (12 year deceleration of extrinsic age) | N/A | 7.02 KB | N/A | N/A | 0.6[@] | 0.2[@] | N/A |
| **66 / male** | 67[#] | 52 (14 year deceleration) *^ | 51 (15 year deceleration) *^ | N/A | 9.05 KB[+] | N/A | 0.6[@] | 0.6[@] | 0.4[$] |
| **74 / male** | N/A | 60 (14 year deceleration) * | N/A | N/A | 9.3 KB[+] | N/A | 1.3[@] | 0.6[@] | |

[≠]Chronological age at the start of the study
*TruDiagnostic, ^Elysium, [#]DNAge, [+]SpectroCell, [$]Jinfiniti, [@]local physician's diagnostic labora

FIG. 1

ELYSIUM

June 2022
sample #: 55102110303819
DOB: 08/31/1953

Biological Age

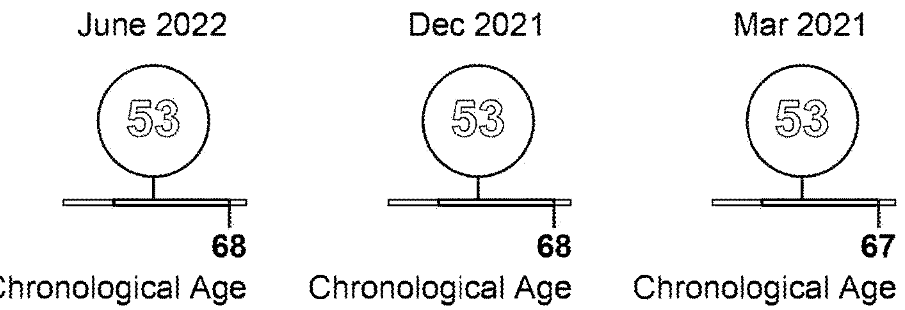

Your biological age is lower than your chronological age.

FIG. 2A

DIAGNOSTIC
LABORATORY
SERVICES, INC.
Diagnostic Laboratory Services, Inc.
99-859 Ninth Street
Aiea, Hawaii 96701

Patient Information:
NAME:
DOB: AGE: 69 SEX: M
PATIENT ID:
PHONE:

| Diagnostic Laboratory Services | | DLS Accession #: YE56728974<br>Spec Collection: 02/02/2023 11:50<br>Report Status: Final<br>Lab Order #: 563410317541409 |
|---|---|---|

Report Comments:

| TEST | RESULT | FLAG | UNITS | REF. RANGE |
|---|---|---|---|---|
| **--RP (High Sensitivity)**<br>Result Released: 02/02/2023 23:19 | 0.5 | | mg/L | |

CRP is an acute phase reactant and can be elevated in various acute or chronic disease states. When used for cardiovascular disease risk assessment the following interpretations are based on guidelines put forth by the CDC and AHA (Circulation. 2003; 107:499-511)

FIG. 2B

Your measurement of Extrinsic Epigenetic Age is 51.81 years

| Test | Meaning | Normal Range Values | Your Percentage as Calculated using Lymphocyte Deconvolution |
|---|---|---|---|
| Lymphs % | Percentage of Lymphocytes: | 20% to 40% | 22.82% |
| | Bcell | | 1.59% |
| | CD4T | | 10.78% |
| | CD8T | | 10.45% |
| Neuts.% | Percentage of Neutrophils | 40% to 40% | 58.12% |
| Monos.% | Percentage of Monocytes | 2% to 8% | 14.53% |
| Eos.% | Percentage of Eosinophils | 1% to 4% | 0.00% |
| CD4/CD8 Ratio | | | 1.03 |

SpectraCell Laboratories
Science + Health + Solutions

6030 North Course Drive, Houston, TX 77072
1(800) 227-5227 | support@ spectracell.com | www.spectracell.com

| PATIENT | | SPECIMEN | | |
|---|---|---|---|---|
| NAME | AGE **67** | ACCESSION ID | DATE COLLECTED **03/23/2021** | |
| | GENDER **Male** | ORDER ID | DATE RECEIVED **03/24/2021** | |
| | | | DATE REPORTED **05/03/2021** | |

Telomere

| Tests | Results | Units |
|---|---|---|
| Telomere Interpretation | 9.01 | Kb |
| Telomere Percentage | 96.00 | % |

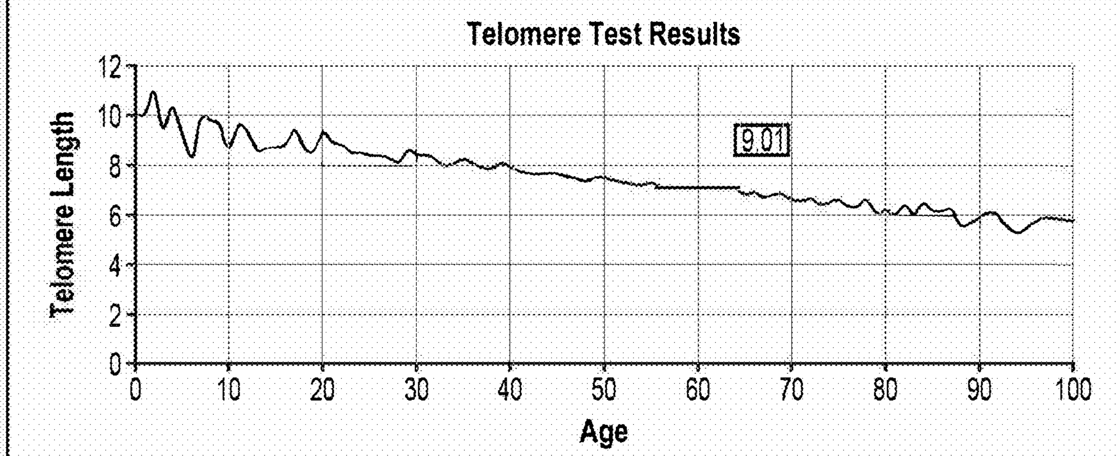

Patient Average Telomere Length: 9.01Kb
Percentile relative to patient age and population: 96.00%

The Patient Telomere Score is a calculation of the patient telomere length derived from nucleated white blood cells obtained from whole blood. This result is graphed relative to the average telomere length of a sample population in the same age range. The higher the telomere score, the "younger" the cells.

FIG. 2E

| PATIENT | | SPECIMEN | | PROVIDER | |
|---|---|---|---|---|---|
| NAME | AGE<br>69 | ACCESSION ID | DATE COLLECTED<br>02/02/2023 | ACCOUNT ID | CLIENT NAME |
| | GENDER<br>Male | ORDER ID | DATE RECEIVED<br>02/06/2023 | ADDRESS | |
| | | | DATE REPORTED<br>03/08/2023 | | |

Telomere

| Tests | Results | Units |
|---|---|---|
| Telomere Length (Average) | 10.38 | Kb |
| Telomere Percentile (Relative to others in the same age group) | 99.00 | % |

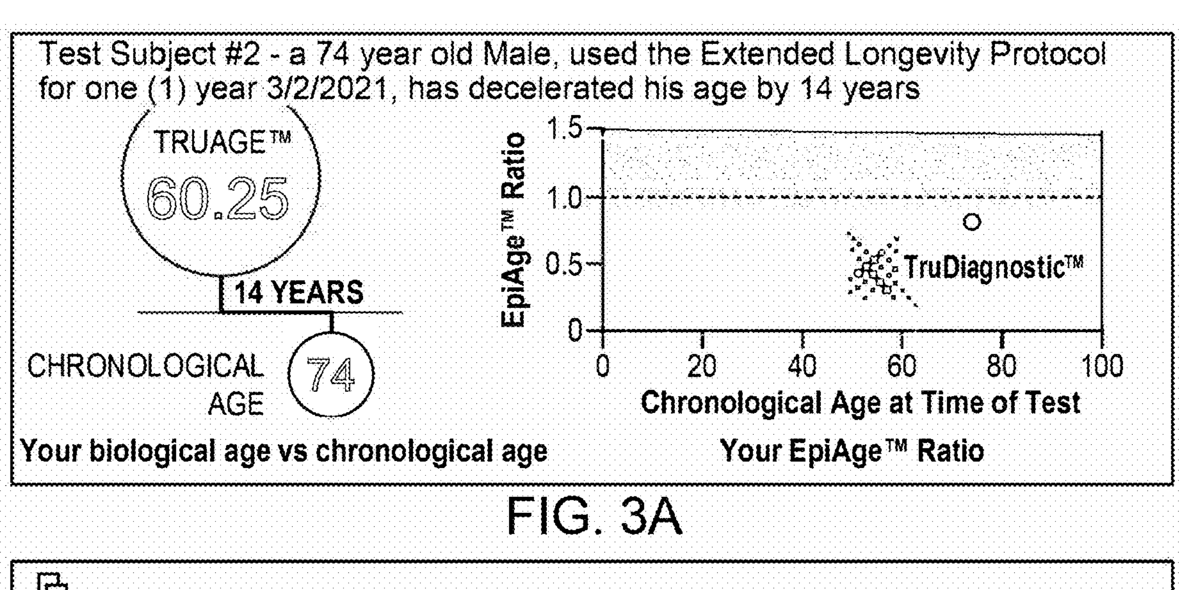

FIG. 3A

SpectraCell Laboratories
Science + Health + Solutions

6030 North Course Drive, Houston, TX 77072
1(800) 227-5227 | support@spectracell.com | www.spectracell.com

| PATIENT | |
|---|---|
| NAME | AGE |
| | 74 |
| DOB | GENDER |
| 2/19/1947 | Male |

| PROVIDER |
|---|
| CLIENT NAME |
| Extended Longevity Inc |

Telomere

| Tests | Results | Units |
|---|---|---|
| Telomere Interpretation | 9.30 | Kb |
| Telomere Percentage | 98.00 | % |

Telomere Test Results

Telomere Length (0–12) vs. Age (0–100); patient value marked 9.3

Patient Average Telomere Length: 9.30Kb
Percentile relative to patient age and population: 98.00%

FIG. 3B

Your measurement of Extrinsic Epigenetic Age is 45.80 years

| Test | Meaning | Normal Range Values | Your Percentage as Calculated using Lymphocyte Deconvolution |
|---|---|---|---|
| Lymphs % | Percentage of Lymphocytes: | 20% to 40% | 25.99% |
| | B | | 4.33% |
| | CD4T | | 21.66% |
| | CD8T | | 0.00% |
| | NK | | 0.00% |
| Neutro% | Percentage of Neutrophils | 40% to 60% | 55.69% |
| Monos.% | Percentage of Monocytes | 2% to 8% | 15.94% |
| Eosino% | Percentage of Eosinophils | 1% to 4% | 0.00% |
| CD4/CD8 Ratio | | | 0.00 |

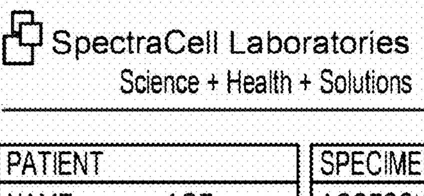
6030 North Course Drive, Houston, TX 77072
1(800) 227-5227 | support@spectracell.com | www.spectracell.com
| PATIENT | | SPECIMEN | | PROVIDER |
|---|---|---|---|---|
| NAME | AGE<br>62 | ACCESSION ID | DATE COLLECTED<br>01/11/2022 | |
| DOB<br>4/9/1959 | GENDER<br>Female | ORDER ID | DATE RECEIVED<br>01/12/2022 | |
| | | | DATE REPORTED<br>02/18/2022 | |
Telomere
| Tests | Results | Units |
|---|---|---|
| Telomere Length (Average) | 7.80 | Kb |
| Telomere Percentile (Relative to others in the same age group) | 75.00 | % |
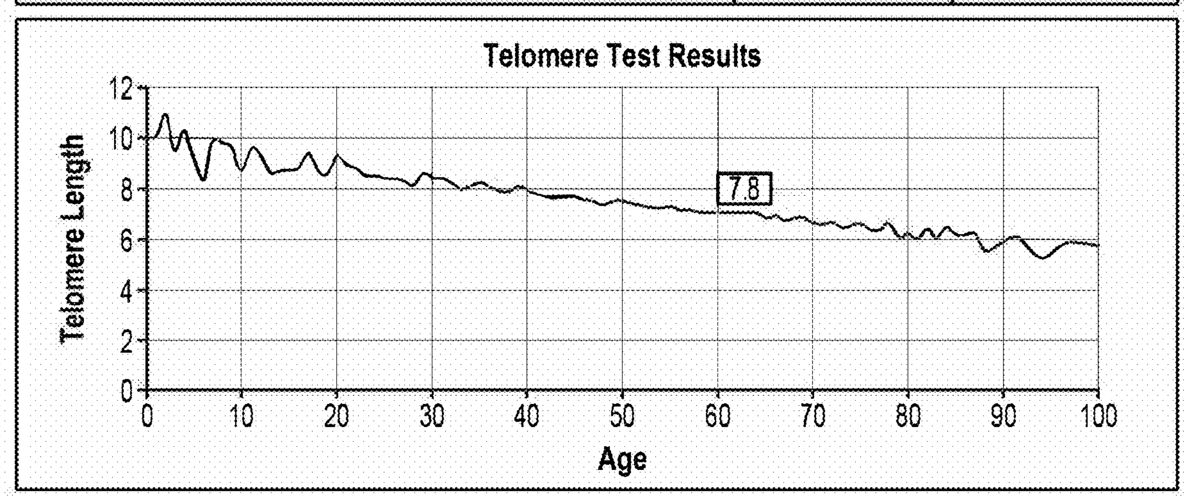
FIG. 5A

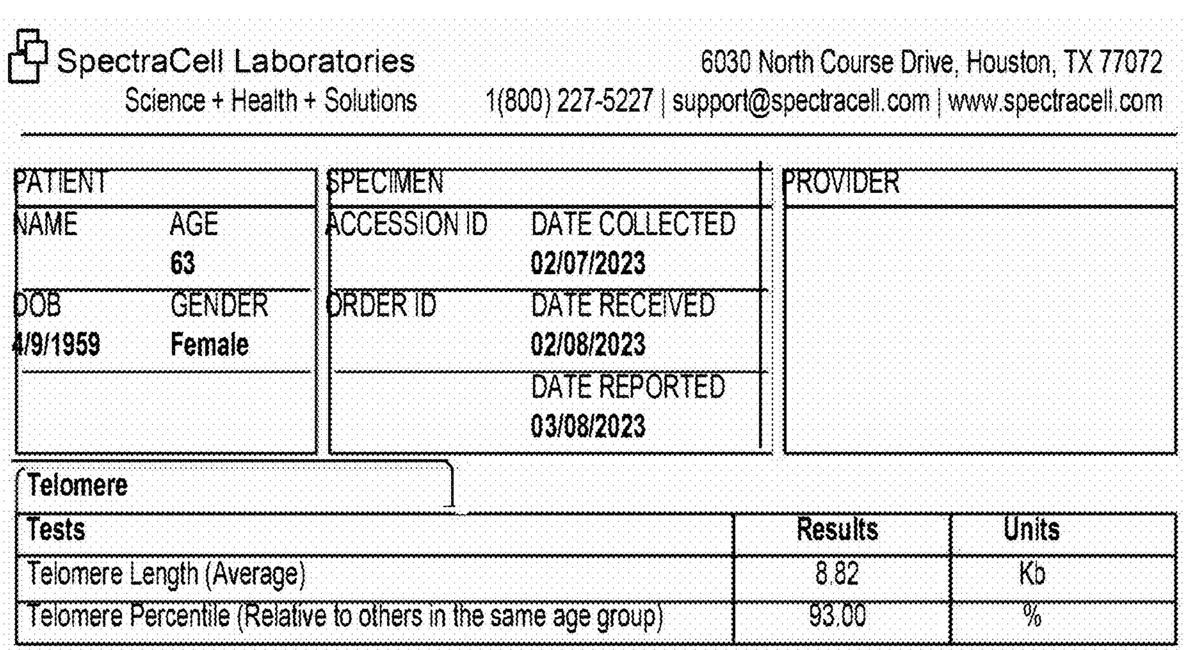

SpectraCell Laboratories
Science + Health + Solutions
6030 North Course Drive, Houston, TX 77072
1(800) 227-5227 | support@spectracell.com | www.spectracell.com

| PATIENT | | SPECIMEN | | PROVIDER |
|---|---|---|---|---|
| NAME | AGE<br>**63** | ACCESSION ID | DATE COLLECTED<br>**02/07/2023** | |
| DOB<br>**4/9/1959** | GENDER<br>**Female** | ORDER ID | DATE RECEIVED<br>**02/08/2023** | |
| | | | DATE REPORTED<br>**03/08/2023** | |

Telomere

| Tests | Results | Units |
|---|---|---|
| Telomere Length (Average) | 8.82 | Kb |
| Telomere Percentile (Relative to others in the same age group) | 93.00 | % |

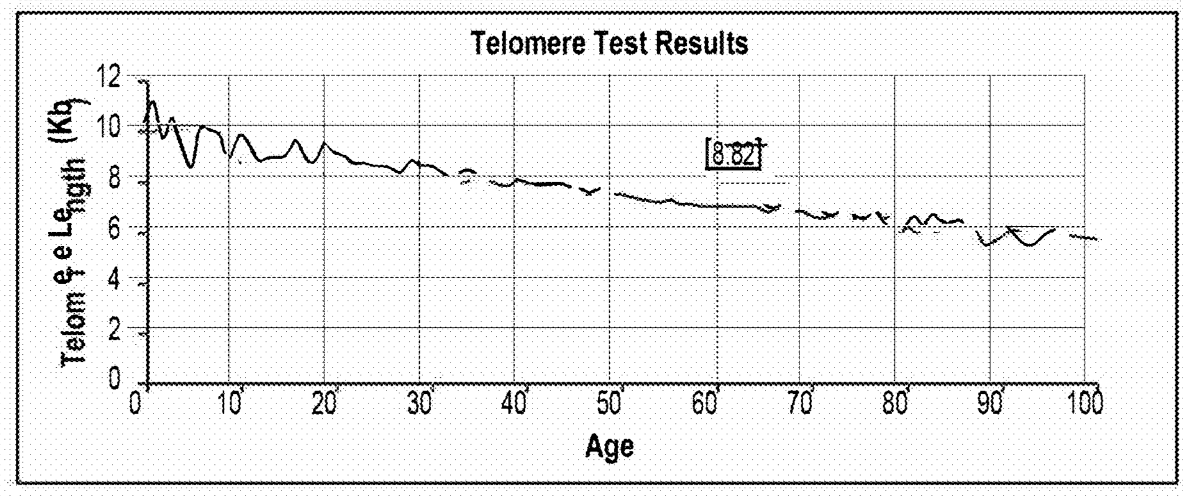

| Table 1. Formulation | Additional disclosure |
|---|---|
| *Pinetonal* | *Designed to address decreased melatonin, pineol, zinc, and selenium* |
| *Pistacia vera* (pistachio) | Source of plant-based melatonin (18 pistachio nuts contain 3 mg melatonin). Rich in phenolic compounds, terpenoids, monoterpenes, flavonoids, alkaloids, saponins, fatty acids, and sterols. The pistachio kernel and seed extracts showed significant antiviral activity. |
| *Scutellaria baicalensis* (Chinese skullcap) | Flavones from *S. baicalensis* root exhibit strong neuroprotective effects in oxidative stress-induced and amyloid-beta-induced neuronal death models. The main flavone, baicalein, strongly inhibits aggregation of neuronal amyloidogenic proteins in vitro and induces dissolution of amyloid deposits. It stimulates brain tissue regeneration, inducing the differentiation of neuronal precursor cells. The efficacy of *S. baicalensis* on TGF-β signaling pathway components has been demonstrated by the SB treatment of cells and resulted in a significant decrease in the expression of TGF-β isoforms, TGF-β receptors, and SMADs. *S. baicalensis* is an analog of the drug Alk5 kinase inhibitor, which is blocks the growth factor's receptors, stopping it from aging the body's stem cells. "This is the first demonstration that we can and a drug that makes the key TGF-beta1 pathway, which is elevated by aging, behave younger, thereby rejuvenating multiple organs". |
| *Passiflora incarnata* (purple passionflower) | Rich source of flavonoids. Multiple bioactive metabolites such as flavonoids (i.e., chrysin that show CNS depressant activity by agonizing GABA-benzodiazepine receptor), amino acids (i.e., GABA), and harmala alkaloids (reversible monoamine oxidase-A inhibitor). Has antioxidant, antiparkinsonian, and memory-enhancing activity. Used in Ayurveda for the treatment of various disorders of the CNS. |
| *Panax quinquefolius* (ginseng) | Source of selenium. Ginseng root significantly extended life span via modulation of multiple longevity assurance genes, including those involved in insulin signaling and stress response pathways. Ginseng extract had an anti-fibrosis effect via the regulation of the transforming growth factor (TGF)-ß1/Smad signaling pathway in an animal model of liver fibrosis. It affected the inhibition of the expression of TGF-ß1, Smad2, and Smad3. |
| *Elitaria cardamomum* (cardamom) | One of the highest sources of plant-based zinc. Extracts may be effective against a variety of bacterial strains that contribute to fungal infections. |
| *Cinnamomum verum* (cinnamon) | Rich in antioxidants, including polyphenols, phenolic acid, and flavonoids. Fights oxidative stress in the body and aid in the prevention of chronic disease. The effects of cinnamon on life span implicated major longevity pathways. These include the DAF-16 transcription factor in the insulin signaling pathway, which promotes expression of stress resistance and the longevity genes. Cinnamon activates the insulin signaling pathway, anti-oxidative pathway and |

FIG. 8B

| | |
|---|---|
| | serotonin signaling for its lifespan prolonging effect. |
| *Thyvolve – thymic involution* | *Designed to regenerate the thymus and reverse the age-dependent process of thymus involution* |
| *Selaginella involvens* | The water extract of *S. involvens* showed a positive reaction to glycosides and possessed both thymus growth-stimulatory and antioxidant properties. Reverses involution of the thymus and exhibits remarkable antioxidant activity. |
| *Pinus sylvestris* (pollen) | High in natural growth hormones. Source of androgenic substances composed of the bioidentical steroid hormone testosterone, along with lesser amounts of other steroids including androstenedione, DHEA, and androsterone. Also contains estrogens (estrone, estriol, estradiol) and progesterone |
| *Curcuma longa* (turmeric root) | Curcumin and other curcuminoids have properties consistent with decreases in inflammatory stress signaling and increases in protective signaling. Curcumin is known to have anti-aging, antioxidant, anti-inflammatory, anti-arthritic, and anticancer effects and increases brain-derived neurotrophic factor BDNF while having a positive effect on Alzheimer's disease and depression. It is also anti-rheumatic, and anti-microbial. |
| *Zingiber officinale* (ginger) | Excellent source of phenolic compounds including gingerols, shogaols, paradols, and gingerdiones. Ginger phenolics, including 6-gingerol, 8-gingerol, 10-gingerol, and 6-shogaol, are the most abundant bioactive constituents of whole ginger extract and exhibit anti-proliferative, anti-inflammatory, anti-oxidative, and anti-tumor properties. |
| *Elitaria cardamomum* | See Pinetonal |
| *Cinnamomum verum* | See Pinetonal |
| *Bluecosig – blood signaling and transcription* | Designed to rejuvenate blood signaling and restore rejunvanative balance to all cells |
| *Caulophyllum thalictroides* (blue cohosh) | Blue Cohosh is a known oxytocin synergist with a long history of use in traditional herbal medicine. Blue cohosh is a popular herb, roots, and rhizomes that have been extensively used for women's health. Alkaloids and saponins are considered to be responsible for their pharmacological effects. Two glycosides in blue cohosh are believed to stimulate oxytocin. It is said to promote menstrual flow, stimulate circulation, and increase the flow of urine. Pharmacological studies have demonstrated that alkaloids and triterpence saponins are responsible for its major biological function as an anti-inflammatory, analgesic, anti-oxidant, antibacterial, antiacetylcholinesterase, and antitumor. |
| *Panax quinquefolius* | See Pinetonal |
| *Scutellaria baicalensis* (Chinese skullcap) | The effect on the TGF-β signaling pathway components has been demonstrated by the SB treatment of cells and resulted in a significant decrease in expression of TGF-β isoforms, TGF-β receptors, and SMADs. It is an analog of the drug Alk5 kinase inhibitor and can block |

FIG. 8C

| | |
|---|---|
| | the growth factor's receptors, stopping it from aging the body's stem cells. It can block the key TGF- β 1 pathway, which is elevated by aging, thereby rejuvenating multiple organ systems. Flavones isolated from the root also exhibit strong neuroprotective effects on the brain. Their neuroprotective potential has been shown in both oxidative stress-induced and amyloid-beta neuronal death models. Baicalein, the main flavone present, strongly inhibited aggregation of neuronal amyloidogenic proteins in vitro and induces dissolution of amyloid deposits. It has been shown to stimulate brain tissue regeneration, inducing differentiation of neuronal precursor cells. |
| *Curcuma longa* (turmeric root) | See Thyvolve |
| ***Telogenic – telomere length*** | ***Designed to address degradation of telomeres, reversing cell loss from telomere attrition*** |
| *Astragalus membranaceus* | Small molecule activator of telomerase and is capable of increasing average telomere length and decreasing the percentage of critically short telomeres. It contains life-prolonging compounds for human use and is "associated with a significant age reversal effect in the immune system, in that it led to declines in the percentage of senescent cytotoxic T cells and natural killer cells after six to twelve months of use".[16] Astragalus root is known for its effects on telomerase, the shortening of telomeres (resulting from such factors as stress and aging). |
| *Centella asiatica* (gotu cola) | Extract triggered an almost 9-fold increase in telomerase activity compared to the untreated cells and is a strong natural telomerase activator with important antiaging effects. Widely used Ayurvedic medicine and traditional Chinese medicine, effective in improving cognitive ability, increasing antioxidant response, as well as treating wound healing |
| *Salix alba* (white willow) | A specific extract of white willow bark is the most potent longevity-extending pharmacological intervention ever described in the scientific literature. In testing, the white willow bark extract increased the average chronological lifespan of yeast by 475% and the maximum chronological lifespan by 369%. |
| ***Sentophagy - senescence*** | ***Designed to increase cellular autophagy and mitophagy*** |
| *Berberis vulgaris* (berberine) | Source of berberine, an analog of metformin (anti-diabetic and component of the TRIIM study formula). Berberine, a major isoquinoline alkaloid, is a potent inhibitor of inflammation Pharmacologic actions include anti-diabetic (Type 2), antidiarrheic, anticancer, and antiinflammation. Improves insulin resistance, lowers blood sugar, and treats lipid metabolism disorders by activating the AMP-activated protein kinase (AMPK) pathways. Inhibits gene expression of proinflammatory cytokines in adipose tissue of obese mice and suppresses inflammatory response through AMPK activation in macrophages. |
| *Taraxacum officinale* | A source of the autophagy inducing flavonoids quercetin, luteolin, apigenin, and luteolin-7-glucoside. Extracts have anti-influenza, |

FIG. 8D

| | |
|---|---|
| (dandelion) | anti-retrovirus activity, antioxidant and hepatoprotective effects. Ethanol extracts reduce inflammation and inhibit angiogenesis. Dandelion contains sesquiterpene lactones believed to have anti-inflammatory and anti-cancer effects. |
| *Camellia sinensis* (green tea) | A source of the autophagy inducing polyamine spermidine. *C. sinensis* has diverse pharmacological activities, including anti-hyperglycemia, antioxidative, anti-obesity, and antitumor activities. The major theaflavins in black tea are theaflavin, theaflavin-3-gallate, theaflavin-3'-gallate, and theaflavin-3,3'-digallate. *C. sinensis* also has a beneficial effect on immunomodulatory activity that is attributed to dietary fibers and specific polyphenols. The polyphenolic compounds in tea demonstrate potential antitumor and anti-oxidant effects in various cancer cell lines, including gastric, colon, and lung. |
| *Curcuma longa* | See Thyvolve |
| *Cinnamomum verum* | See Pintonal |
| ***Inflasolve – inflammaging*** | ***Designed to reduce systemic inflammation that is a root cause of aging*** |
| *Curcuma longa* | See Thyvolve |
| *Boswellia sacra* | Anti-inflammatory, anti-arthritic, anti-rheumatic, anti-diarrheal, antihyperlipidemic, anti-asthmatic, anti-cancer, anti-microbial, anti-fungal, anticomplementary, and analgesic activity. |
| *Salix alba* | See Telogenic; the mechanism of action of *S. alba* is similar to that of aspirin a nonselective inhibitor of COX-1 and COX-2, used to block inflammatory prostaglandins. Salicin from *S. alba* bark is converted to salicylic acid by the liver and is considered to have fewer side effects than aspirin. |
| *Camellia sinensis* | See Sentophagy; Use in the treatment of arthritic disease as an anti-inflammatory agent has been recognized. Epigallocatechin-3 galate, the most abundant catechin in *C. sinensis*, inhibits IL-1-induced proteoglycan release and type 2 collagen degradation in cartilage explants. It also suppresses IL-1b and attenuates activation of the transcription factor NF-kB. |
| *Cinnamomum verum* | See Pinetonal |
| ***Stemegenis – stem cell exhaustion*** | ***Designed to regenerate active stem cells*** |
| *Garcinia indica* | Fruit rind contains hydroxy citric acid, an anti-obesity agent. The major class of secondary metabolites reported from different parts of the plant are benzophenones, biflavonoids, xanthones, and anthocyanins. Rind is a rich source of the benzophenone garcinol, attributed with potential bioactivities, especially antioxidant and cytotoxic. Cyanidin-3-glucoside and cyanidin-3- sambubioside were identified as the major red pigments in the fruit rind. |
| *Astragalus* | See Telogenic |

FIG. 8E

| | |
|---|---|
| *membracanus* | |
| *Cinnamomum verum* | See Pinetonal |
| ***CMEnhance – cellular metabolic efficiency*** | ***Designed to support Cellular Metabolic Efficiency, increasing resveratrol, sirtuins, Nicotinamide adenine dinucleotide (NAD), Nicotinamide mononucleotide (NMN)*** |
| *Polygonum cuspidatum* | Abundant in resveratrol a multi-biofunctional phytochemical, stilbenes and anthraquinones, such as polydatin, anthraglycoside B, and emodin. Possesses wound healing activity and has been effective for inflammatory diseases, hepatitis, tumors, and diarrhea |
| *Scutellaria baicalensis* | See Blucosig |
| *Tabebuia avellanedae* | Anti-inflammatory, antibacterial, and anticancer activity. Active pharmacological compounds such as naphthoquinones, furanonaphthoquinones, anthraquinones, β-lapachone, benzoic acid derivatives, benzaldehyde derivatives, cyclopentene derivatives, iridoids, coumarins, anthraquinone-2-carboxylic acid, and flavonoids have been extracted. Inhibitory activity on inflammatory cytokines, tumor necrosis factor-α, and interleukin-1β. |
| *Curcuma longa* | See Thyvolve |
| *Cinnamomum verum* | See Pinetonal |
| ***Epiverse - Epigenetic clock*** | ***Designed to address DNA cytosine methylation*** |
| *Berberis vulgaris* (berberine) | See Sentophagy |
| Pinus sylvestris (pine pollen) | See Thyvolve. |
| *Lepidium meyenii* (Maca) | Natural source of DHEA. Contains polysaccharides, polyphenols (flavonolignans), macaenes, macamides, glucosinolates, and alkaloids. Various bioactivities of Maca include enhanced reproductive health, antifatigue, antioxidation, neuroprotection, antimicrobial activity, anticancer, hepatoprotection, immunomodulation, and improving skin health and digestive system's function. |
| *Taraxacum officinale* (dandelion) | Source of Vitamin D. Source of autophagy inducing flavonoids quercetin, luteolin, apigenin, and luteolin-7-glucoside. Also contains sesquiterpene lactones believed to have anti-inflammatory and anticancer effects. Ethanol extracts of dandelion reduce inflammation and inhibit angiogenesis. |
| *Elitaria cardamomum* | See Pinetonal. |
| *Cinnamomum verum* | See Pinetonal. |
| ***Elastage ECM – extracellular matrix*** | ***Designed to stimulate the growth of elastin and strengthen the*** |

FIG. 8F

| *stiffening* | *flexibility of the extracellular matrix* |
|---|---|
| *Paeonia lactiflora* (peony) | Penta-galloyl-glucose (PGG) is known to induce elastogenisis. PGG bound specifically to arterial elastin and preserved the integrity of elastic lamellae despite the presence of high levels of proteinases derived from inflammatory cells. PGG-induced vascular relaxation was closely related to activation of an NO cyclic GMP pathway |
| *Antheum graveolens* (dill) | Dill extract has been demonstrated to stimulate elastin production in vitro in dermal equivalent models and in skin fibroblasts to increase gene expression of lysyloxidase-like-1, an enzyme contributing to tropoelastin crosslinking and elastin formation. |
| *Camellia seneisis* | See Sentophagy; contains EGCG, the major green tea catechin, which significantly inhibits COX-1 and thromboxane synthase (TXAS) production in platelets, which are two major enzymes responsible for the platelet aggregation. Also, inhibition of NOs, prostaglandins, thromboxanes, and leukotrienes, which are the main mediators of inflammation, have been observed upon the administration of tea extracts. *C. sinensis* extract revealed significant improvement in the elastic tissue contents of analyzed specimens. |
| *Vitiis vineferia* | Grape seed extract stimulates keratinocyte proliferation in vitro. Distribution studies have shown that connective tissue is the main target for procyanidins from *V. vinifera*. The activity of procyanidins is related to interaction with the ECM (e.g., collagen and elastin fibers). Stabilization of the ECM has been associated with procyanidins occurring in herbal extracts, through direct adsorption |
| *Curcuma longa* | See Thyvolve; Enhances production of major structural components of elastic fibers, elastin, and fibrillin-1, in normal human fibroblast cells by increasing ELN and FBN1 promoters' activities |
| *Cinnamomum vera* | See Pinetonal |

EXTRACTS FOR HEALTH SUPPLEMENTS

CROSS-REFERENCE TO RELATED APPLICATIONS

The present application claims the benefit of Applicant's United States ("U.S.") Provisional Patent Application No. 63/319,699 filed Mar. 14, 2022, titled, EXTRACTS FOR HEALTH SUPPLEMENTS, the entirety of which is hereby incorporated by this reference as if fully set forth herein.

FIELD OF THE DISCLOSURE

The present disclosure relates generally to plant derived extracts for health supplements.

BACKGROUND

Aging is characterized by the accumulation of deleterious changes in cells and tissues that increase the risk of disease and can result in an increase in mortality. These changes are the primary risk factors for many aging-related diseases, including cancer, macular degeneration, ontological decline, thinning of skin, loss of hair, loss of bone density, hypertension, erectile dysfunction, hypotension, loss of muscle, dementia, diabetes, cardiovascular disorders, and neurodegenerative diseases. As the world's population ages and the burden of chronic age-related diseases rises, there is a need to develop novel therapeutic approaches to alleviate the biological burden of aging. Multiple molecular pathways operate collectively to regulate biological aging. These pathways lead to hallmark features of aging that accumulate during the human lifespan, including mitochondrial dysfunction, telomere attrition, epigenetic alterations, genomic instability, loss of proteostasis, cellular senescence, imbalanced metabolism, stem cell exhaustion, decreased autophagy function, and immune aging. The result is development of myriad chronic illnesses including heart disease, stroke, neurodegeneration, and diabetes.

Aging is the leading risk factor for chronic disease. As a result of improved healthcare, many developed countries have experienced an "epidemiologic transition": the decrease in infectious diseases has increased life expectancy; however, the risk of age-related diseases has also increased. According to the World Health Organization's Global Burden of Disease project, age-related diseases will account for over 87% of disability and death by 2030. With the current world population of people over 65 at approximately 617 million and expected to reach 1.5 billion by 20501, aging and the associated diseases are a significant socio-economic burden.

It is therefore a desideratum to provide supplements and modalities, which may be combinatorial for the above health issues.

DISCLOSURE

Disclosed herein are phytotherapeutic extracts as supplements and/or treatments support one or more of reduction in biological age as measured by telomere length and biological homeostasis. The protocol includes at least ingesting on a daily basis a cocktail of compositions including Pinetonal, Thyvolve, Bluecosig, Telogenic, Sentophagy, Inflasolve, Stemegenis, CMEnhance, Epiverse and, Elastage ECM. In some instances the module component compositions are produced via reflux extraction. After at least six months of daily ingestion of between 0.5 ml and 1.5 ml of the modules telomere length as measured by telomeres in nucleated white blood cells is longer than it was when measured before the daily ingestion began. In some instances telomere length is at least one of 2%, 5%, 10%, 13.5% longer. In some instances the daily ingestion is at least ½ ml. In some instance the daily ingestion is at least 1 ml. In some instance the daily ingestion is at least 1.1 ml.

After at least six months of daily ingestion of between 0.5 ml and 1.5 ml of the modules telomere length as measured by telomeres in nucleated white blood cells is longer than it was when measured before the daily ingestion began C reactive protein is reduced by at least 20% In some instances the daily ingestion is at least ½ ml. In some instance the daily ingestion is at least 1 ml. In some instance the daily ingestion is at least 1.1 ml.

Disclosed herein are phytotherapeutic extracts as supplements and/or treatments support one or more of reduction in biological age as measured by telomere length the method to increase the length of telomeres includes daily ingestion of a predetermined quantity of modules forming a cocktail; and, wherein the modules are Pinetonal, Thyvolve, Bluecosig, Telogenic, Sentophagy, Inflasolve, Stemegenis, CMEnhance, Epiverse and, Elastage ECM.

Disclosed herein are phytotherapeutic extracts as supplements and/or treatments support health and biological homeostasis which includes a state of steady internal, physical, and chemical conditions maintained by living systems of optimal functioning for the organism. Maintaining homeostasis correlates to longer lifespan. The compositions are configured to supplement ten aging factors: Pineal, Hypothalamus, Superchiasmatic nucleus dysregulation; Telomere attrition; Epigenetic alterations; Thymic Involution; Blood Signaling of cellular aging; Mitochondrial dysfunction; Cellular senescence; Stem Cell Exhaustion; Inflammation; and Extracellular Matrix stiffening and cross-linking.

In some instances one or more of the compositions disclosed herein are configured individually or in combination to supplement health which may lessen or ameliorate changes in cells and tissues that increase the risk of disease and can result in an increase in mortality These changes are the primary risk factors for many aging-related diseases, including but not limited to, cancer, macular degeneration, infertility, ontological decline, thinning of skin, loss of hair, loss of bone density, hypertension, hypotension, loss of muscle, dementia, diabetes, cardiovascular disorders, and neurodegenerative diseases.

DRAWINGS

The disclosure may be better understood by referring to the following figures. The components in the figures are not necessarily to scale, emphasis instead being placed upon illustrating the principles of the invention. In the figures, like reference numerals designate corresponding parts throughout the different views.

FIG. 1 is a table showing genetic test data with respect to telomers from 4 individuals.

FIG. 2A-2F shows test results for subject 1 regarding aspects of chronological age markers versus biological age markers.

FIG. 3A-3B shows test results for subject 2 regarding aspects of chronological age markers versus biological age markers.

FIG. 5A-5B shows before and after telomere measurements for a subject showing telomere lengthening.

FIG. 8 is a table of aspects of compositions of matter and formulations.

Figure 2C:
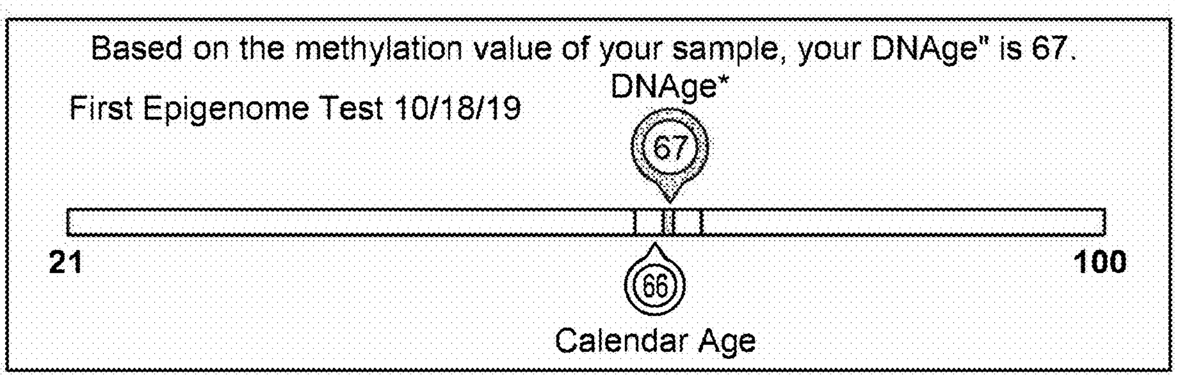

In the Figures, like reference numerals designate corresponding parts throughout the different views. All callouts and annotations in any figures or test data re hereby incorporated by this reference as if fully set forth herein. All cited references are hereby incorporate by this reference as if fully set forth herein.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

Further Disclosure

Disclosed herein are phytotherapeutic extracts and Complementary and Alternative Medicine (CAM) synergistic and mimetic herbal analog formulations to address the diseases of aging, support health, and extend the human lifespan One protocol consists of at least ten phytotherapeutic formulations. Telomere length testing at intervals after ingestion of the formulations have shown lengthening over time.

FIG. 1, shows in four adults (42, 58, 67, 74 years old) who used a cocktail of all modules described below daily for at least 12 months which shows changes in aging biomarkers (cytosine methylation on the epigenome, telomere length, and inflammation as measured by high sensitivity C-reactive protein test) that correlate to biological age, according to the algorithms interpreting the statistical data related to the data base of test subject the independent testing laboratory has compiled. Telomere length is one measure of cellular age. Other measures include the bodies innate immune system and its ability to counteract disease and pathogens. Telomere Length Test using the Spectra Cell Laboratory telomere test from measuring telomers in nucleated white blood cells high.

FIGS. 2A-5 shows epigenetic tests data using of several subjects who have been ingesting a cocktail of Pinetonal, Thyvolve, Bluecosig, Telogenic, Sentophagy, Inflasolve, Stemgenis, CMEnhance, Epiverse, and Elastage ECM (described in detail below) for a period of time as measured independently by one or more of the ElysiumHealth.com/index, TruDiagnostic Epigenome tests. C-Reactive Protein Inflammation marker test.

Figure 2D:
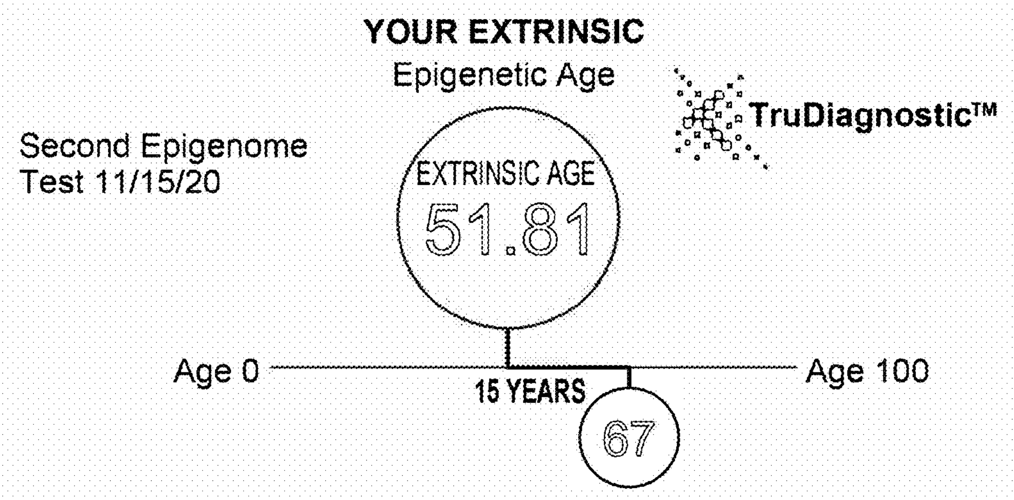
Figure 2F:
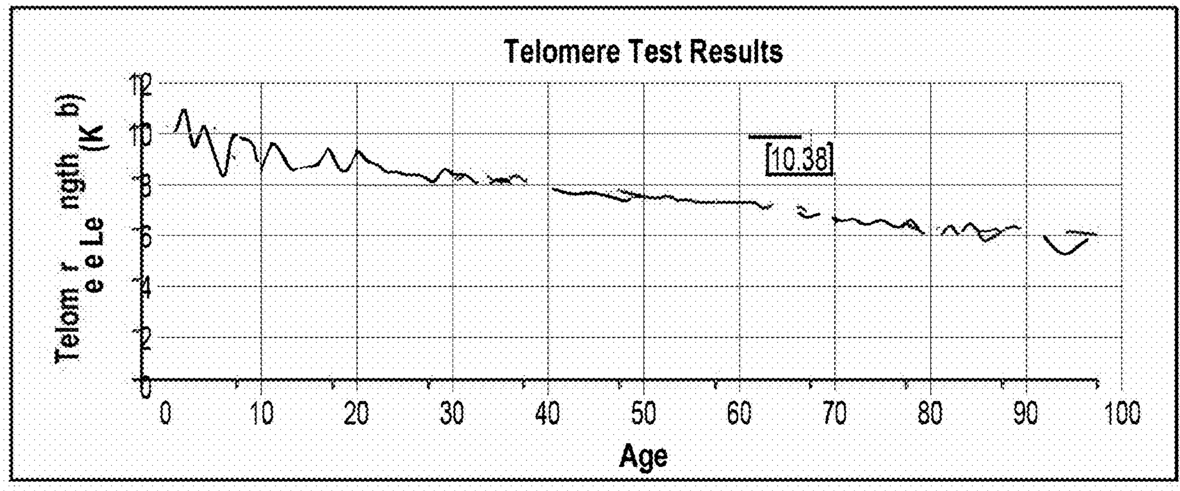

FIG. 2A-2F shows test results for subject 1 regarding aspects of chronological age markers versus biological age markers. Subject one started testing at age 66 and is currently 69. FIG. 2A shows independent testing with results of biological age remaining steady at 53 over one year of testing. FIG. 2B is a C reactive protein test. FIG. 2C is a methylation measure. FIG. 2D shows epigenetic results. FIG. 2E is a telomere length test taken over one year prior to the telomere length test in FIG. 2F. The length measurements shows lengthening.

FIG. 3A-3B shows test results for subject 2 regarding aspects of chronological age markers versus biological age markers. FIG. 3A shows a reduced biological age versus chronological age. FIG. 3B shows telomere length after more than 6 months of cocktail daily ingestion corresponding to a biological age less than the 74-year-old chronological age.

Figure 4A:
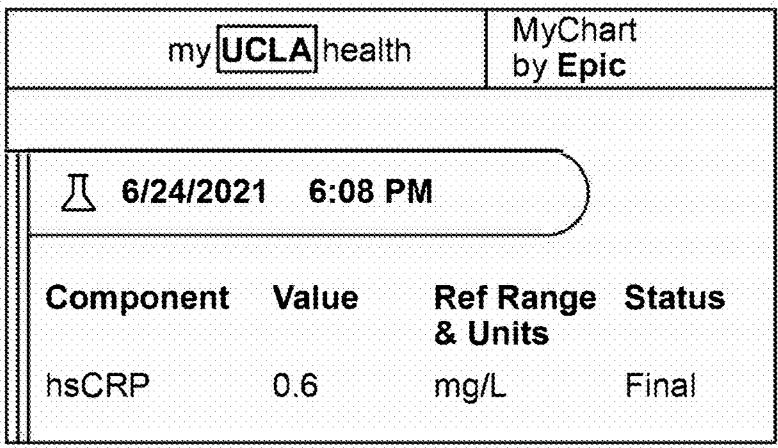
FIG. 4A-4D shows test results for subject 3 regarding aspects of chronological age markers versus biological age markers.
Figure 4B:
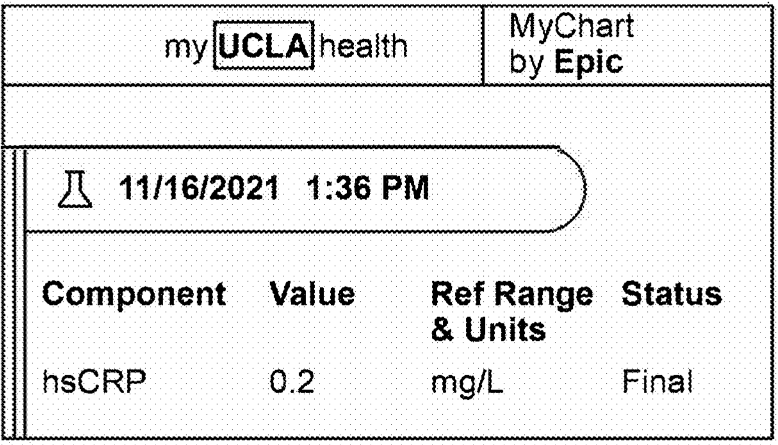
Figure 4C:
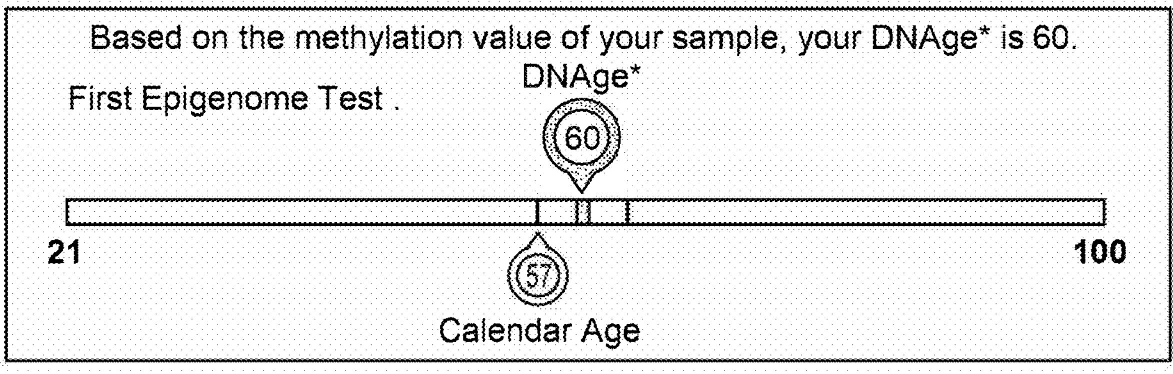
Figure 4D:
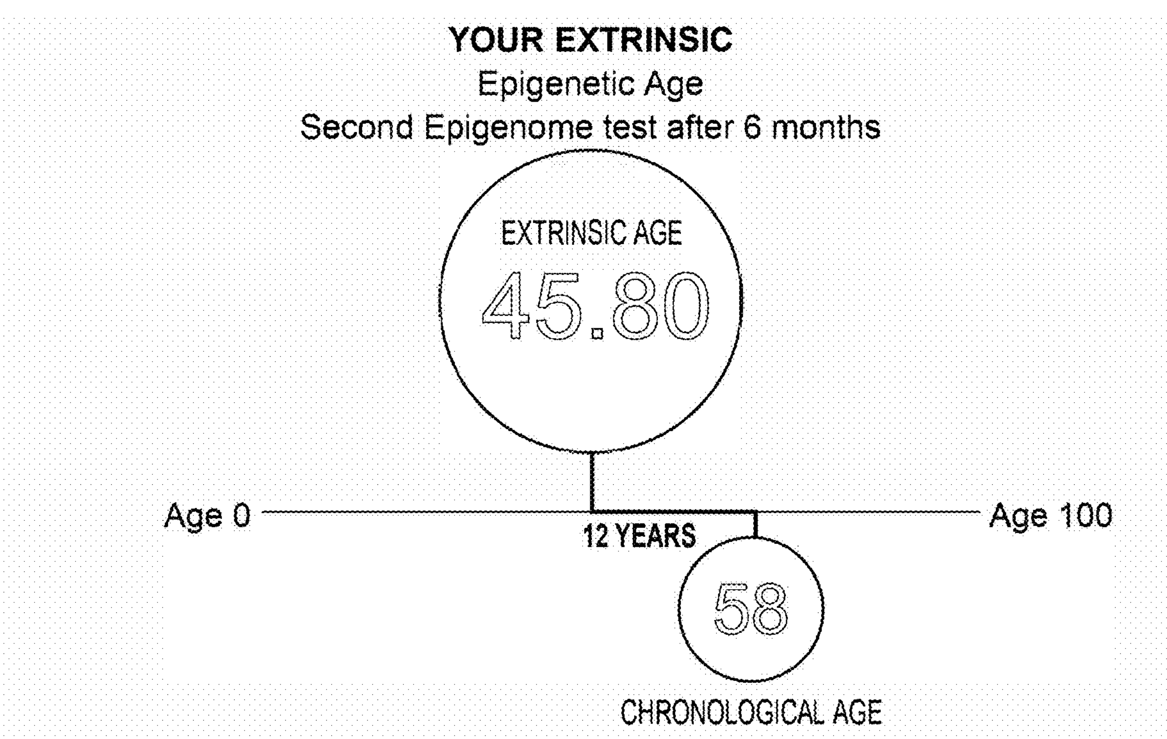

FIG. 4A-4D shows test results for subject 3 regarding aspects of chronological age markers versus biological age markers. FIG. 4A is before and FIG. 4B after C reactive protein measurements showing a reduction. The 58-year-old subject had a first epigenetic test taken with the results of a 60-year-old biological age shown in FIG. 4C after 6 months of cocktail daily ingestion FIG. 4D shows a decrease to 45.8 years.

FIG. 5A-5B shows before and after telomere data for a subject taken about one year apart. The subject telomere length has increased from 7.8 kb to 8.82 kb which corresponds to a reduction in biological age of the telomere over a one-year period. The subject was taking the cocktail daily for the time between tests and was taking between 0.8 ml and 1.1 ml per day of each cocktail module.

The repreparation of the composition forming the cocktail components is a reflux extraction technology (see FIG. 6 and FIG. 7) configured to extract targeted or designated phytotherapeutic source plant to formulate for optimum effectiveness by extracting the plants beneficial phytochemical content using heat, organic alcohol, and deep ocean water for maximum bioavailability.

Below is a discussion about the cocktail formed of modules. Each module is a composition of plants beneficial phytochemical. Modules have been named for ease of reverence and the naming is not intended as a limitation. For each module forming the cocktail, the dose aliquots in some instances are at least 0.5 ml. Dose aliquots of each module composition in some instances are at least 1.0 ml. Dose aliquots of each module in some instances are above 1.0 ml. In some instances, the modules may be premixed together at the correct molar ration without any significant reduction in efficacy. In some instances, the module composition is maintained separately and mixed in the proper aliquot at the time of consumption via oral. In some instances, one or more of the modules may be infused via an IV in a carrier of saline, Vitamin C or other suitable fluid. In some instances, one or more of the module compositions may be injected subcutaneously or intramuscularly.

In some instances, one or more of the modules may be used as an adjuvant to enhance other pharmaceutically effective therapeutics including but not limited to chemolytic compounds or therapeutics, senolytic compounds or therapeutics, anti-viral, anti-parasitic, and antibiological compounds or therapeutics.

The modules that are available to form the cocktail are named:

1. Pintonal;
2. Thyvolve;
3. Bluecosig;
4. Telogenic;
5. Sentophagy;
6. Inflasolve;
7. Stemgenis;
8. CMEnhance;
9. Epiverse; and
10. Elastage ECM.

Module Compositions:

Aspects of the effect of the Pinetonal formulation are discussed below. The pineal gland synthesizes melatonin, a signaling molecule of natural photoperiodic environment and a potent neuronal protective antioxidant. Melatonin and its metabolites have been shown to significantly reduce the oxidative stress burden of aging cells or cells exposed to toxins. Melatonin levels decrease with age. The pineal gland of a 60-year-old produces half the amount of melatonin of a 20-year-old. As melatonin levels drop, signs of aging become evident as the pineal gland aging clock breaks down. The disappearance of the nocturnal peak of melatonin is a sign that the organism is aging and with it the deterioration of the hormonal control of essential functions. In addition to its effects on the circadian rhythm, melatonin is a potent and widespread anti-inflammatory agent, reducing chronic and acute inflammation. Melatonin exerts its anti-inflammatory effects by modulating both pro- and anti-inflammatory cytokines.

Regular consumption of at least one of the modules disclosed herein supplement the body to promote homeostasis. Biological homeostasis has been associated with reduction in the incidence of at least of cancer, macular degeneration, infertility, ontological decline, thinning of skin, loss of hair, loss of bone density, hypertension, hypotension, loss of muscle, dementia, diabetes, cardiovascular disorders, and neurodegenerative diseases.

Regular consumption of at least two of the modules disclosed herein supplement the body to promote homeostasis. Biological homeostasis has been associated with reduction in the incidence of at least of cancer, macular degeneration, infertility, ontological decline, thinning of skin, loss of hair, loss of bone density, hypertension, hypotension, loss of muscle, dementia, diabetes, cardiovascular disorders, and neurodegenerative diseases.

Regular consumption of at least three of the modules disclosed herein supplement the body to promote homeostasis. Biological homeostasis has been associated with reduction in the incidence of at least of cancer, macular degeneration, infertility, ontological decline, thinning of skin, loss of hair, loss of bone density, hypertension, hypotension, loss of muscle, dementia, diabetes, cardiovascular disorders, and neurodegenerative diseases.

Regular consumption of at least four of the modules disclosed herein supplement the body to promote homeostasis. Biological homeostasis has been associated with reduction in the incidence of at least of cancer, macular degeneration, infertility, ontological decline, thinning of skin, loss of hair, loss of bone density, hypertension, hypotension, loss of muscle, dementia, diabetes, cardiovascular disorders, and neurodegenerative diseases.

Regular consumption of at least five of the modules disclosed herein supplement the body to promote homeostasis. Biological homeostasis has been associated with reduction in the incidence of at least of cancer, macular degeneration, infertility, ontological decline, thinning of skin, loss of hair, loss of bone density, hypertension, hypotension, loss of muscle, dementia, diabetes, cardiovascular disorders, and neurodegenerative diseases.

Regular consumption of at least six of the modules disclosed herein supplement the body to promote homeostasis. Biological homeostasis has been associated with reduction in the incidence of at least of cancer, macular degeneration, infertility, ontological decline, thinning of skin, loss of hair, loss of bone density, hypertension, hypotension, loss of muscle, dementia, diabetes, cardiovascular disorders, and neurodegenerative diseases.

Regular consumption of at least seven of the modules disclosed herein supplement the body to promote homeostasis. Biological homeostasis has been associated with reduction in the incidence of at least of cancer, macular degeneration, infertility, ontological decline, thinning of skin, loss of hair, loss of bone density, hypertension, hypotension, loss of muscle, dementia, diabetes, cardiovascular disorders, and neurodegenerative diseases.

Regular consumption of at least eight of the modules disclosed herein supplement the body to promote homeostasis. Biological homeostasis has been associated with reduction in the incidence of at least of cancer, macular degeneration, infertility, ontological decline, thinning of skin, loss of hair, loss of bone density, hypertension, hypotension, loss of muscle, dementia, diabetes, cardiovascular disorders, and neurodegenerative diseases.

Regular consumption of at least nine of the modules disclosed herein supplement the body to promote homeostasis. Biological homeostasis has been associated with reduction in the incidence of at least of cancer, macular degeneration, infertility, ontological decline, thinning of skin, loss of hair, loss of bone density, hypertension, hypotension, loss of muscle, dementia, diabetes, cardiovascular disorders, and neurodegenerative diseases.

Regular consumption of all of the modules disclosed herein supplement the body to promote homeostasis. Biological homeostasis has been associated with reduction in the incidence of at least of cancer, macular degeneration, infertility, ontological decline, thinning of skin, loss of hair, loss of bone density, hypertension, hypotension, loss of muscle, dementia, diabetes, cardiovascular disorders, and neurodegenerative diseases.

Module Compositions

PINETONAL: The composition of Pinetonal contains, *Pistacia vera* (pistachio). This extract is a source of plant-based melatonin (18 pistachio nuts contain 3 mg melatonin). Rich in phenolic compounds, terpenoids, monoterpenes, flavonoids, alkaloids, saponins, fatty acids, and sterols. The pistachio kernel and seed extracts have also been shown to have antiviral activity.

*Scutellaria baicalensis* has flavones from *S. baicalensis* root which have been shown to exhibit neuroprotective effects in oxidative stress-induced and amyloid-beta-induced neuronal death models. The main flavone, baicalein, strongly inhibits aggregation of neuronal amyloidogenic proteins in vitro and induces dissolution of amyloid deposits. It stimulates brain tissue regeneration, inducing the differentiation of neuronal precursor cells. The efficacy of *S. baicalensis* on TGF-β signaling pathway components has been demonstrated by the SB treatment of cells and resulted in a significant decrease in the expression of TGF-β isoforms, TGF-β receptors, and SMADs. *S. baicalensis* is an analog of the drug Alk5 kinase inhibitor, which blocks the growth factor's receptors, which may stop or reduce aging of the body's stem cells.

*Passiflora incarnata* is a rich source of flavonoids. Multiple bioactive metabolites such as flavonoids (i.e., chrysin that show CNS depressant activity by agonizing GABA-benzodiazepine receptor), amino acids (i.e., GABA), and harmala alkaloids (reversible monoamine oxidase-A inhibitor). These metabolites have been shown to have antioxidant, antiparkinsonian, and memory-enhancing activity. *Passiflora incarnata* has been used in Ayurveda for the treatment of various disorders of the CNS.

*Panax quinquefolius* (*ginseng* root), is a source of selenium. *Ginseng* root modulates multiple longevity assurance genes, including those involved in insulin signaling and stress response pathways. *Ginseng* extract has been shown to have an anti-fibrosis effect via the regulation of the transforming growth factor (TGF)-β1/Smad signaling pathway in an animal model of liver fibrosis. It affected the inhibition of the expression of TGF-β1, Smad2, and Smad3.

*Elitaria cardamomum*, is a source of plant-based zinc. Zinc has shown effectiveness against a variety of bacterial strains that also contribute to fungal infections.

*Cinnamomum verum* is rich in antioxidants, including polyphenols, phenolic acid, and flavonoids shown to address oxidative stress in the body and aid in the prevention of chronic disease. The effects of cinnamon on longevity pathways include DAF-16 transcription factor in the insulin signaling pathway, which promotes expression of stress resistance. Cinnamon activates the insulin signaling pathway, anti-oxidative pathway and serotonin signaling.

THYVOLVE: Aspects of the effect of the Thyvolve formulation are discussed below. The deterioration of the immune system with progressive aging is believed to contribute to morbidity and mortality in elderly humans due to the increased incidence of infection, autoimmunity, and cancer. One of the consequences of an aging immune system is the process termed "thymic involution", where the thymus undergoes a progressive reduction in size due to profound changes in its anatomy associated with loss of thymic epithelial cells and a decrease in thymopoiesis. This decline in the output of newly developed T cells results in diminished numbers of circulating naive T cells and impaired cell-mediated immunity. The thymus is capable of regenerating and restoring its function to a degree. Potential mechanisms for this endogenous thymic regeneration include keratinocyte growth factor (KGF) signaling and a more recently described pathway in which innate lymphoid cells produce interleukin-22 (IL-22)

The composition of Thyvolve include *Selaginella involvens, Pinus sylvestris, Curcuma longa, Zingiber officinale, Elitaria cardamomum* and *Cinnamomum verum*. Extracts of *Selaginella involvens* have shown a positive reaction to glycosides and to possess thymus growth-stimulatory and antioxidant properties. Reverses involution of the thymus and exhibits antioxidant activity. *Pinus sylvestris* is high in natural growth hormones and a source of androgenic substances composed of the bioidentical steroid hormone testosterone, along with lesser amounts of other steroids including androstenedione, DHEA, and androsterone. Also contains estrogens (estrone, estriol, estradiol) and progesterone. *Curcuma longa* contains Curcumin and other curcuminoids which have properties consistent with decreases in inflammatory stress signaling and increases in protective signaling. Curcumin is has shown anti-aging, antioxidant, anti-inflammatory, anti-arthritic, and anticancer effects and increases brain-derived neurotrophic factor BDNF while having a positive effect on Alzheimer's disease and depression. It is also anti-rheumatic, and anti-microbial. *Zingiber officinale* (ginger) is a source of phenolic compounds including gingerols, shogaols, paradols, and gingerdiones. Ginger phenolics, including 6-gingerol, 8-gingerol, 10-gingerol, and 6-shogaol, are the most abundant bioactive constituents of whole ginger extract and exhibit anti-proliferative, anti-inflammatory, anti-oxidative, and anti-tumor properties.

BLUECOSIG: Aspects of the effect of the Bluecosig formulation are discussed below. A few morphogenic pathways account for most of the phenotypes of aging. In a process called "heterochronic parabiosis", a young and old animal were surgically connected to share common blood circulation, regenerated the old partner while the young partner declined. It has been deduced that this result was from key signaling networks regulating stem cells. Pathway-based approaches for enhancing aged tissue repair have been seen by systemic delivery of oxytocin (OT) which induces MAPK/pERK signaling, by forced activation of Notch-1, by antagonism of TGF-β/pSmad signaling, or by antagonism of the Jak/Stat pathway. The translational ramifications are the attenuation and reversal of tissue attrition and decline of cognitive performance in old mammals for many age-associated degenerative and metabolic diseases. Diminishing TGF-β signaling and adding OT achieves a broad rejuvenation of the brain, liver, and muscle.

The composition of Bluecosig contain *Panax quinquefolius, Scutellaria baicalensis, Curcuma longa* and *Caulophyllum thalictroides* (blue cohosh). Blue Cohosh and *Trigonella foenum* are known oxytocin synergists with a long history of use in traditional herbal medicine. Blue cohosh is a popular herb, roots, and rhizomes that have been extensively used for women's health. Alkaloids and saponins are considered to be responsible for their pharmacological effects. Two glycosides in blue cohosh are believed to stimulate oxytocin. It is said to promote menstrual flow, stimulate circulation, and increase the flow of urine. Pharmacological studies have demonstrated that alkaloids and triterpene saponins are responsible for its major biological function as an anti-inflammatory, analgesic, anti-oxidant, antibacterial, antiacetylcholinesterase, and antitumor.

TELOGENIC: Aspects of a cocktail comprising the Telogenic formulation includes the effect of the Telogenic formulation as discussed below. This formulation is designed to address degradation of telomeres, reversing cell loss from telomere attrition. Also see Table 1. Telomeres, caps found at the ends of chromosomes, protect DNA during cellular division. With every cell division throughout life, telomeres lose a bit of their DNA. This shortening process acts as an aging clock counting down the remaining life of the cell. Reactivating telomerase, the enzyme responsible for maintaining telomere length, can rescue cells from death and reduce the chance of DNA damage. The Telogenic composition contains compounds including *Astragalus membranaceus, Centella asiatica*, and *Salix alba*. Subject data from subjects supplementing with the telogenic formulation in FIGS. 1 and 2 have shown remarkable increases in telomere length as shown in FIGS. 1 and 2. In several lab verified studies telomere length of each subject showed lengthening and corresponded to a biological age less than the chronological age of the subject. As such telogenic is a supplement that has shown to contribute to extending telomere length. *Astragalus membranaceus*, is considered a small molecule activator of telomerase and is capable of increasing average telomere length and decreasing the percentage of critically short telomeres. It contains compounds associated with age reversal effect in the immune system, in that it has been shown to lead to declines in the percentage of senescent cytotoxic T cells and natural killer cells after six to twelve months of use". *Astragalus* root is known for its effects on telomerase. *Centella asiatica* has been shown to trigger an almost 9-fold increase in telomerase activity compared to the untreated cells and is a strong natural telomerase activator. Widely used Ayurvedic medicine and traditional Chinese medicine. *Salix alba* is a specific extract of white willow bark has been shown to testing increase the average chronological lifespan of yeast by 475% and the maximum chronological lifespan by 369%.

SENTOPHAGY: Aspects of the effect of the Sentophagy formulation are discussed below. Cellular senescence is a permanent state of cell cycle arrest induced by cellular stresses. During the aging process, senescent cells (SCs) increasingly accumulate in tissues, causing a loss of tissue-repair capacity because of cell cycle arrest in progenitor cells and producing proinflammatory molecules which are known as the senescence-associated secretory phenotype (SASP) which contribute to the development of various age-related diseases. Senolytic therapies selectively induce apoptosis in senescent cells. Targeting senescent cells using genetic, pharmacological, or herbal plant-based approaches delays, prevents, or alleviates multiple age-related phenotypes, chronic diseases, geriatric syndromes, and loss of physiological resilience. The Sentophagy formulation includes *Berberis vulgaris, Taraxacum officinale, Camellia sinensis, Curcuma longa* and *Cinnamomum verum.*

*Berberis vulgaris*, is a source of berberine, an analog of metformin (anti-diabetic and component of the TRIIM study formula). Berberine, a major isoquinoline alkaloid, is a potent inhibitor of inflammation Pharmacologic actions include anti-diabetic (Type 2), antidiarrheic, anticancer, and antiinflammation. Improves insulin resistance, lowers blood sugar, and treats lipid metabolism disorders by activating the AMP-activated protein kinase (AMPK) pathways. Inhibits gene expression of proinflammatory cytokines in adipose tissue of obese mice and suppresses inflammatory response through AMPK activation in macrophages.

*Taraxacum officinale* is a source of the autophagy inducing flavonoids quercetin, luteolin, apigenin, and luteolin-7-glucoside. Extracts have been shown to have anti-influenza, anti-retrovirus activity, antioxidant and hepatoprotective effects. Ethanol extracts reduce inflammation and inhibit angiogenesis. Dandelion contains sesquiterpene lactones believed to have anti-inflammatory and anti-cancer effects.

*Camellia sinensis* is a source of the autophagy inducing polyamine spermidine. *C. sinensis* has diverse pharmacological activities, including anti-hyperglycemia, antioxidative, anti-obesity, and antitumor activities. The major theaflavins in black tea are theaflavin, theaflavin-3-gallate, theaflavin-3'-gallate, and theaflavin-3,3'-digallate. *C. sinensis* also has a beneficial effect on immunomodulatory activity that is attributed to dietary fibers and specific polyphenols. The polyphenolic compounds in tea demonstrate potential antitumor and anti-oxidant effects in various cancer cell lines, including gastric, colon, and lung.

INFLASOLVE: Aspects of the effect of the Inflasolve formulation are discussed below. Curcuminoids, occurring in turmeric root, have beneficial effects in a large array of diseases, including cancer, cardiovascular disease, and neurodegenerative disorders, primarily attributed to their antioxidant properties. Curcumin has been shown to inhibit mediators of the inflammatory response, including cytokines, chemokines, adhesion molecules, growth factors, and enzymes like cyclooxygenase (COX), lipoxygenase (LOX), and inducible nitric oxide (NO) synthase genes involved in cell proliferation, adhesion, survival, and differentiation. The anti-inflammatory effects of curcumin result from its ability to inhibit the NF-κB pathway, as well as other pro-inflammatory pathways like the mitogen-activated protein kinase (MAPK) and the Janus kinase (JAK)/Signal transducer and activator of transcription (STAT)-dependent signaling pathways. Curcumin reduces secretion of TNF-α and IL-10 and the production of COX-2-induced prostaglandin G2. Curcumin content for alcohol extract of turmeric is 10.23% compared to 3.5% in average turmeric powders. For a given dose or equal amounts of the two, alcoholic turmeric extract provides more curcumin. Research has shown increased solubility of curcumin (12-fold) and turmeric (3-fold) by the use of heat. The Infasolve formulation includes *Curcuma longa, Salix, alba, Camellia sinensis, Cinnamomum verum* and *Boswellia sacra, Boswellia sacra* has shown anti-inflammatory, anti-arthritic, anti-rheumatic, anti-diarrheal, antihyperlipidemic, anti-asthmatic, anti-cancer, anti-microbial, anti-fungal, anticomplementary, and analgesic activity.

STEMEGENIS: Aspects of the effect of the Stemgenesis formulation are discussed below. Stem cells are precursor biological cells that can self-renew and differentiate into multiple mature cells. The prevalent theories of tissue decline in aging focused on cumulative cell-intrinsic changes such as telomere attrition, DNA damage, oxidative damage, and mitochondrial dysfunction. Stem cell regenerative capacity persists throughout life, but the biochemical cues regulating organ stem cells change with age in ways that preclude productive regenerative responses. This causes the abandonment of tissue maintenance and repair in the old cells. Medicinal plants have received considerable attention as stimulants for stem cell proliferation in vivo and in vitro. The Stemgenesis formulation includes *Astragalus membracanus, Cinnamomum verum* and Garcinia indica. Garcinia indica contains hydroxy citric acid, an anti-obesity agent. The major class of secondary metabolites reported from different parts of the plant are benzophenones, bioflavonoids, xanthones, and anthocyanins. Rind is a rich source of the benzophenone garcinol, attributed with potential bioactivities, especially antioxidant and cytotoxic. Cyanidin-3-glucoside and cyanidin-3-sambubioside were identified as the major red pigments in the fruit rind.

CMENHANCE: Aspects of the effect of the CMEnhance formulation discussed below. Oxidative stress is an imbalance between the production and manifestation of reactive oxygen species (ROS) and a biological system's ability to readily detoxify the reactive intermediates or to repair the resulting damage. In humans, oxidative stress is thought to be involved in the development of many diseases or may exacerbate their symptoms. Production of ROS is a particularly destructive aspect of oxidative stress. Within the cell mitochondria, ATP oxidative phosphorylation produces ROS as a byproduct of the cell's energy creation reaction. When oxidative stress is minimized Cellular Metabolic Efficiency (CME) is achieved, thus increasing the efficiency of the cell mitochondria's ATP energy-producing reaction. The CME enhance formulation includes *Polygonum cuspidatum, Scutellaria baicalensis, Curcuma longa, Cinnamomum verum* and *Tabebuia avellanedae. Polygonum cuspidatum* is abundant in resveratrol a multi-biofunctional phytochemical, stilbenes and anthraquinones, such as polydatin, anthraglycoside B, and emodin. Possesses wound healing activity and has been effective for inflammatory diseases, hepatitis, tumors, and diarrhea. *Tabebuia avellanedae*. Anti-inflammatory, antibacterial, and anticancer activity. Active pharmacological compounds such as naphthoquinones, furanonaphthoquinones, anthraquinones, β-lapachone, benzoic acid derivatives, benzaldehyde derivatives, cyclopentene derivatives, iridoids, coumarins, anthraquinone-2-carboxylic acid, and flavonoids have been extracted. Inhibitory activity on inflammatory cytokines, tumor necrosis factor-α, and interleukin-1β.

EPIVERSE: Aspects of the effect of the Epiverse formulation are discussed below. Epigenetics refers to the modification of DNA, RNA, or protein, which can change and regulate these molecules without altering the primary sequence. Genetics, lifestyle, diet, and other environmental factors affect these modifications and therefore how genes behave. DNA methylation, the most studied epigenetic modification, is now recognized as a reliable indicator of biological age. The Epiverse formulation includes *Berberis vulgaris, Pinus sylvestris, Elitaria cardamomum, Cinnamomum verum, Taraxacum officinale* and *Lepidium meyenii* (Maca). Maca is a source of DHEA. Contains polysaccharides, polyphenols (flavonolignans), macaenes, macamides, glucosinolates, and alkaloids. Various bioactivities of Maca include enhanced reproductive health, antifatigue, antioxidation, neuroprotection, antimicrobial activity, anticancer, hepatoprotection, immunomodulation, and improving skin health and digestive system's function. The *Taraxacum officinale* is a source of Vitamin D; Source of autophagy inducing flavonoids quercetin, luteolin, apigenin, and luteolin-7-glucoside. Also it contains sesquiterpene lactones believed to have anti-inflammatory and anticancer effects. Ethanol extracts of dandelion reduce inflammation and inhibit angiogenesis.

ELASTAGE ECM: Aspects of the effect of the Elastange ECM formulation are discussed below. The extracellular matrix (ECM) is mostly comprised of collagen and elastin. Both proteins are extremely long-lived. The long life of these proteins makes them extremely susceptible to modifications such as glycation, and carbonylation. Mineralization and glycation reduce the sensitivity of collagen to metalloproteinases, increasing its susceptibility to crosslink and adduct formation. The longevity of elastin is comparable with the human lifespan and any proteolytic damage that occurs with age and disease is essentially irreparable. Since elastogenesis is restricted to fetal development and infancy, the elastin content of tissues (especially, vessel walls) decreases with time. The decrease in elastin, in turn, increases collagen content and ECM stiffness because collagen has a higher elastic modulus. Increased stiffness is a causative factor of many age-related diseases such as hypertension, and atherosclerosis. The decrease in elastin content puts the upper limit on the functioning of cardiovascular and pulmonary systems and this limit is estimated to be about 100-120 years for humans. The Elastage ECM formulation includes *Camellia seneisis, Cinnamomum verum, Curcuma longa, Paeonia lactiflora Antheum graveolens*, and *Vitiis vineferia. Paeonia lactiflora* contains Penta-galloyl-glucose (PGG) which is known to induce elastogenisis. PGG bound specifically to arterial elastin and preserved the integrity of elastic lamellae despite the presence of high levels of proteinases derived from inflammatory cells. PGG-induced vascular relaxation was closely related to activation of an NO cyclic GMP pathway. *Antheum graveolens* a dill extract has been demonstrated to stimulate elastin production in vitro in dermal equivalent models and in skin fibroblasts to increase gene expression of lysyloxidase-like-1, an enzyme contributing to tropoelastin crosslinking and elastin formation. *Vitiis vineferia* is Grape seed extract stimulates keratinocyte proliferation in vitro. Distribution studies have shown that connective tissue is the main target for procyanidins from *V. vinifera*. The activity of procyanidins is related to interaction with the ECM (e.g., collagen and elastin fibers). Stabilization of the ECM has been associated with procyanidins occurring in herbal extracts, through direct adsorption.

One or more additional modules (and the compositions therein) may be included in the cocktail. These additional module compositions are Conidium, Emophix and Cognilace.

CNIDIUM: is an immune boosting supplement of Phytotherapeutic Extracts of *Cnidium* Monneri, *Curcuma longa, Zingiber officinale* and *Cinnamomum verum*. The principal action of *Cnidium* is to stop the P38 MAPK aging pathway which increase TIM4 thus causing the Macrophages population to increase.

EMOPHIX: contains phytotherapeutic extracts of *Bacopa monniera, Clitoria ternata, Centella asiatica, Withania somnifera, Pannax ginseng* and *Cinnamomum vera*. The principal action of Emophix is to stimulate the growth of new dendrites in the Amygdala. The purpose of dendritic regeneration in the Amygdala is to allow new neural pathways to be developed in the part of the brain known to control emotions, a proposed mechanism of action is to support new emotional pathways and neural connections.

COGNILACE: contains phytotherapeutic extracts of Astragulus membranous, *Salvia miltiorrhiz*, Radic Paoenia rubras, *Polygonum multiflorum, Dryobalanops aromatica* (Borneal), *Callus spatholobi* and *Cinnamomum vera*. The principal action of Cognilace is in modulating the Integrated Stress Response (ISR) by modulating the PERK pathways that induce the sustained PERK signaling associated with chronic or severe endoplasmic reticulum (ER) insults. Imbalances in ER proteostasis can propagate to extracellular environments through the secretion of proteins in non-native conformations that accumulate as toxic oligomers and aggregates associated with proteotoxicity in etiologically diverse protein aggregation diseases, including many amyloid diseases.

Figure 6:
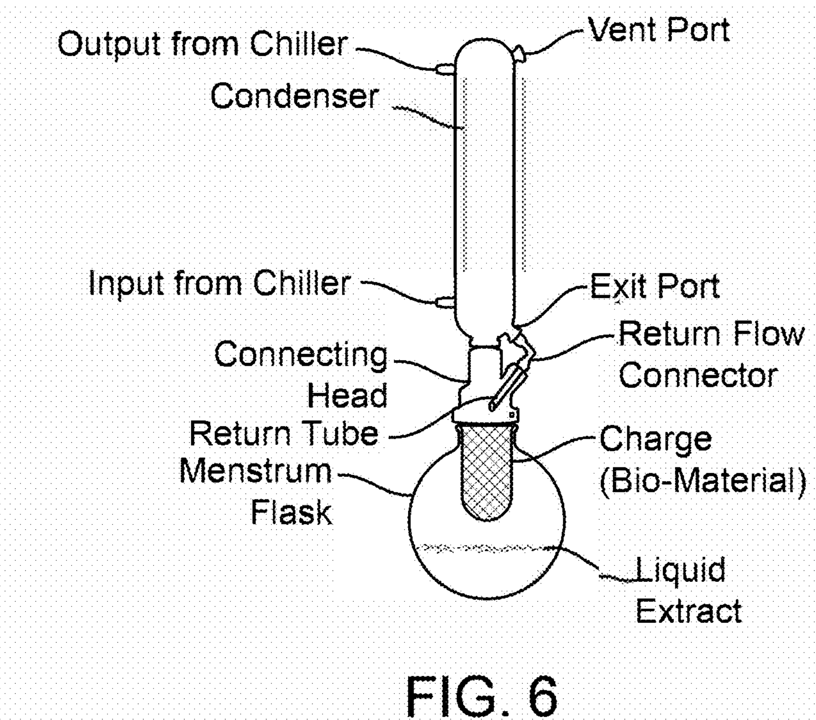
FIG. 6 is a diagram of an extraction process.

FIG. 6 is a diagram of a still set consists of the menstruum flask; a reverse cold finger condenser with 4 input/output ports, two for circulating cold water and two input/output ports for the return of the menstruum from the condenser to the menstruum flask via the head; including a neutral atmosphere filtration port; a single or double port head connecting the flask and a connector connecting the output port of the condenser with the input port of the head. Distributed reflux extraction process. Our reflux extraction technology and protocol extract the desired plant's phytochemical constituency, extracting for optimum yield, consistency, and. effectiveness. This process extracts the beneficial phytochemical content using heat, time, and a hydro alcohol solvent (a mixture of organic alcohol, and deep ocean water harvested from the thermohaline layer of the Pacific Ocean at a depth of 3,000 feet off the coast of Kona, Hawaii), for maximum bioavailability. This approach maintains the efficiency of the extraction process and phytochemical characteristics of the plant. To date, we have achieved an array of 6 distributive still sets, corresponding to a yield of 700 L/month. The set up. A still set consists of all glass components including the menstruum flask (typically 22 L); a reverse cold finger condenser with four input/output ports, two for circulating cold water and two input/output ports for the return of the menstruum from the condenser to the menstruum flask via the head; including a neutral atmosphere filtration port; a single or double port head connecting the flask and a connector connecting the output port of the condenser with the input port of the head.

A nylon sock is suspended into the menstruum flask and filled with the charge (the plant material to be extracted). Before the head is attached to the flask with a metal pressure clamp, the menstruum solvent consisting of hydro alcohol is poured over the charge and into the menstruum flask, which is sitting on a sand bath contained in a parabolic metal dish, which sits upon a propane gas jet burner and frame. Once the hydro alcohol and charge have been loaded, the condenser is secured to the head. A chiller attached to the condenser has been pre-run and circulating the coolant to affect a temperature parameter of 6 C. The propane gas jet burner is then fired up and the extraction begins.

Figure 7:
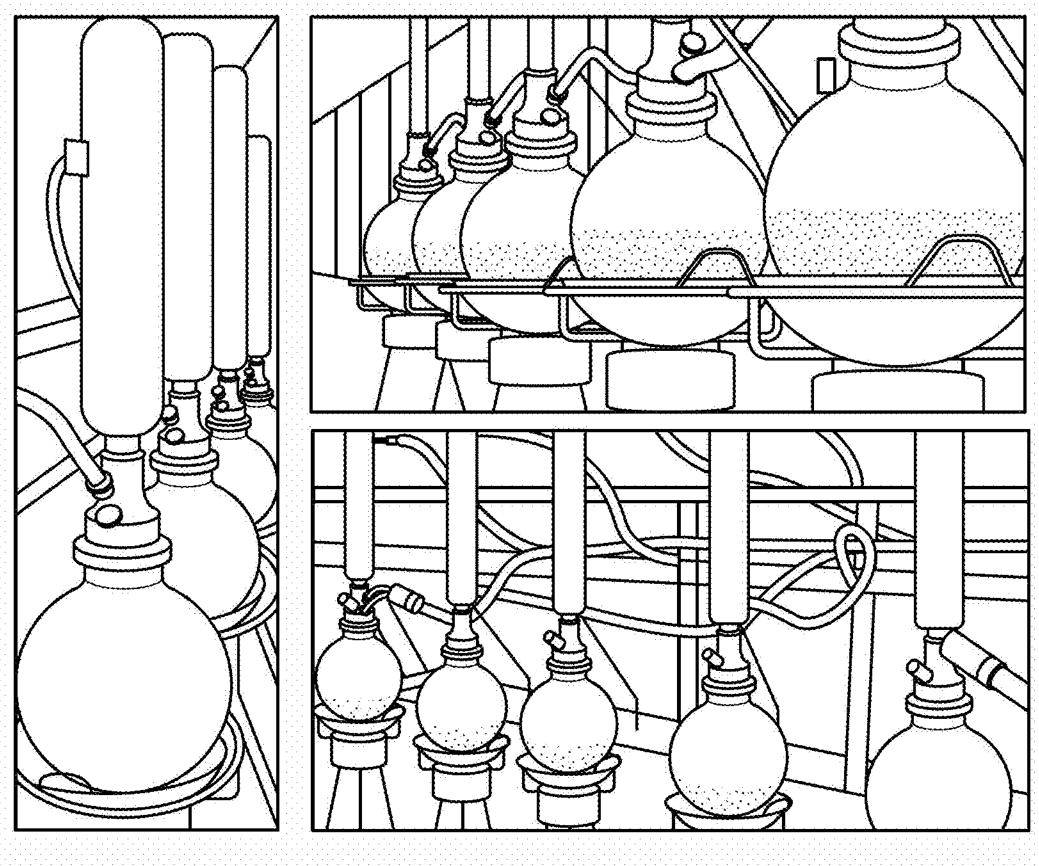
FIG. 7 is an overview of extraction process.

FIG. 7 is an overview of a five array still set for extraction of turmeric. Set-up for Hydrodistillation. Each still set (FIG. 6) is part of a distributed array that is connected to a thermo-chiller, circulating the coolant via an input and output manifold. Typically, one chiller can serve 5-6 still sets.

The invention claimed is:

1. A method of making a cocktail which lengthen telomeres comprising: a reflux extraction step, wherein at least *Astragalus membranaceus, Centella asiatica*, and *Salix alba* are extracted using a hydro alcohol solvent comprising: a mixture of organic alcohol, and deep ocean water harvested from the thermohaline layer of the Pacific Ocean at a depth of about 3,000 feet collected off the coast of Kona, Hawaii to produce at least *Astragalus membranaceus, Centella asiatica*, and *Salix alba*; and, wherein after a subject has at least six months of daily ingestion of the cocktail the subject's telomere length is longer than it was when measured before the daily ingestion began.

2. The method of claim 1, wherein after a subject has at least six months of daily ingestion of the cocktail the subject's telomere length as measured by telomeres in nucleated white blood cells high is longer than it was when measured before the daily ingestion began.

3. The method of claim 1, wherein the telomere length is at least 2% longer.

4. The method of claim 1, wherein the telomere length is at least 5% longer.

5. The method of claim 1, wherein the telomere length is at least 10% longer.

6. The method of claim 1, wherein the dose of each module is oral ingestion of about 0.5 ml daily.

7. The method of claim 1, wherein the dose of each module is oral ingestion of about 1.0 ml daily.

8. The method of claim 1, wherein the dose of each module is oral ingestion of at least about 1.1 ml daily.

9. The method of claim 1, wherein C reactive protein is reduced by at least 20%.

10. The method of claim 1, wherein C reactive protein is reduced by at least 30%.

11. The method of claim 1, wherein C reactive protein is reduced by at least 20% the measured telomere length is increased by at least 2%.

12. The method of claim 1, wherein C reactive protein is reduced by at least 30% the measured telomere length is increased by at least 4%.

13. The cocktail of claim 1, further comprising at least one of Garcinia indica, *Curcuma longa, Camellia sinensis, Cinnamomum verum* and *Boswellia sacra*.

* * * * *